(12) United States Patent
Ikeya

(10) Patent No.: US 9,457,640 B2
(45) Date of Patent: Oct. 4, 2016

(54) HEATING APPARATUS OF FUEL CELL VEHICLE

(75) Inventor: Kengo Ikeya, Shizuoka-ken (JP)

(73) Assignee: Suzuki Motor Corporation (JP)

( * ) Notice: Subject to any disclaimer, the term of this patent is extended or adjusted under 35 U.S.C. 154(b) by 456 days.

(21) Appl. No.: 13/701,600

(22) PCT Filed: Jun. 6, 2011

(86) PCT No.: PCT/JP2011/062883
§ 371 (c)(1),
(2), (4) Date: Dec. 3, 2012

(87) PCT Pub. No.: WO2012/002105
PCT Pub. Date: Jan. 5, 2012

(65) Prior Publication Data
US 2013/0087305 A1    Apr. 11, 2013

(30) Foreign Application Priority Data
Jul. 2, 2010    (JP) .................................. 2010-152049

(51) Int. Cl.
*B60H 1/16*    (2006.01)
*B60H 1/14*    (2006.01)
(Continued)

(52) U.S. Cl.
CPC ........... *B60H 1/14* (2013.01); *H01M 8/04014* (2013.01); *H01M 8/06* (2013.01); *B60H 1/143* (2013.01); *H01M 2250/20* (2013.01); *Y02E 60/50* (2013.01); *Y02T 90/32* (2013.01)

(58) Field of Classification Search
CPC ................... B60H 1/143; B60H 2001/00185; B60H 1/14; B60H 1/16; B60H 1/00385; H01M 8/06; H01M 8/04014; H01M 2250/20; Y02T 90/32; Y02E 60/50; F24H 2240/10
USPC ......... 237/12.3 A, 2 A, 28, 12.3 R; 903/908, 903/944
IPC ......... B60H 1/16, 1/18, 1/14, 1/02; H01M 8/06
See application file for complete search history.

(56) References Cited

U.S. PATENT DOCUMENTS

| | | | | |
|---|---|---|---|---|
| 5,156,926 A | * | 10/1992 | Lemoine | H01M 8/04089 429/410 |
| 8,241,810 B2 | * | 8/2012 | Frank | H01M 8/04089 429/433 |

(Continued)

FOREIGN PATENT DOCUMENTS

| | | |
|---|---|---|
| CN | 2652694 Y | 11/2004 |
| CN | 1737426 A | 2/2006 |

(Continued)

OTHER PUBLICATIONS

"CN_2652694 Mach Trans.pdf"; Machine Translation; http://www.epo.org; Apr. 6, 2015.*

(Continued)

*Primary Examiner* — Gregory Huson
*Assistant Examiner* — Daniel E Namay
(74) *Attorney, Agent, or Firm* — Myers Bigel & Sibley

(57) ABSTRACT

A heating apparatus for a fuel cell vehicle is provided. The apparatus includes a fuel cell for generating electricity by a chemical reaction of oxygen and hydrogen, a cathode exhaust passage through which outside air introduced and supplied to the cathode electrode of the fuel cell so as to be used for the power generation reaction is discharged from the fuel cell, and an anode exhaust passage through which the hydrogen is discharged from the fuel cell. The heating apparatus further includes a branch passage which is branched from a branch point of the cathode exhaust passage and supplies the air discharged from the fuel cell to the vehicle compartment, and the anode exhaust passage is joined to the cathode exhaust passage on the downstream side of the branch point.

6 Claims, 7 Drawing Sheets

(51) Int. Cl.
*H01M 8/06* (2016.01)
*H01M 8/04* (2016.01)
*B60H 1/02* (2006.01)

(56) References Cited

U.S. PATENT DOCUMENTS

| | | | |
|---|---|---|---|
| 2005/0112431 A1* | 5/2005 | Hamada | H01M 8/04022 429/441 |
| 2006/0008756 A1 | 1/2006 | Kaupert et al. | |
| 2006/0127743 A1* | 6/2006 | Lee | B01B 1/005 429/436 |
| 2007/0015031 A1* | 1/2007 | Numata | H01M 8/04089 429/408 |
| 2008/0038602 A1* | 2/2008 | Yu | H01M 8/04097 429/415 |
| 2009/0095051 A1* | 4/2009 | Suzuki | G01N 1/2226 73/23.2 |
| 2009/0113913 A1 | 5/2009 | Esaki | |
| 2009/0123796 A1* | 5/2009 | Takahashi | H01M 8/0612 429/411 |
| 2009/0176135 A1* | 7/2009 | Saito | B60L 1/00 429/422 |
| 2009/0186245 A1* | 7/2009 | Frank | H01M 8/04089 429/431 |
| 2009/0229899 A1* | 9/2009 | Takeshita | B60L 11/1881 180/65.31 |
| 2010/0003552 A1* | 1/2010 | Kelly | F24D 12/02 429/411 |
| 2010/0035098 A1* | 2/2010 | Ramani | H01M 8/04223 429/429 |
| 2010/0092822 A1* | 4/2010 | Hornburg | B60H 1/032 429/437 |
| 2010/0151284 A1* | 6/2010 | Burch | H01M 8/04014 429/444 |
| 2010/0203404 A1* | 8/2010 | Miyazaki | H01M 8/04014 429/423 |
| 2010/0310955 A1* | 12/2010 | Yadha | H01M 8/04231 429/429 |
| 2011/0183225 A1* | 7/2011 | Harris | H01M 8/04455 429/443 |
| 2013/0087305 A1* | 4/2013 | Ikeya | 165/41 |
| 2013/0320910 A1* | 12/2013 | Reiser | H01M 8/04619 320/101 |

FOREIGN PATENT DOCUMENTS

| | | |
|---|---|---|
| EP | 1619737 A1 | 1/2006 |
| EP | 1790511 A2 | 5/2007 |
| JP | 63-243664 | 10/1988 |
| JP | 2001-030742 | 2/2001 |
| JP | 2002-005478 | 1/2002 |
| JP | 2002005532 A * | 1/2002 |
| JP | 2002343396 A * | 11/2002 |
| JP | 2004146144 A * | 5/2004 |
| JP | 2004-166488 A | 6/2004 |
| JP | 2006-035885 | 2/2006 |
| JP | 2008-108538 | 5/2008 |
| JP | 2008-130470 A | 6/2008 |
| JP | 2009-113610 A | 5/2009 |
| JP | 2009-140872 A | 6/2009 |
| JP | 2009-266472 | 11/2009 |

OTHER PUBLICATIONS

"JP_2001030742 Mach Trans (doc).pdf"; Machine Translation; http://dossierl.j-platpat.inpit.go.jp; Apr. 6, 2015.*
"JP_2004166488 Mach Trans.pdf"; Machine Translation; http://dossier1.j-platpat.inpit.go.jp; Apr. 6, 2015.*
"JP_2009226472 Mach Trans.pdf"; Machine Translation; http://dossier1.j-platpat.inpit.go.jp; Apr. 6, 2015.*
Office Action corresponding to Chinese Application No. 201180031018.2 issued Aug. 4, 2014.
International Search Report corresponding to International Application No. PCT/JP2011/062833 mailed Sep. 6, 2011.
Office Action corresponding to Japanese Application No. 2010-152049 issued May 22, 2014.
Examination Report corresponding to UK Patent Application No. 1221013.4 issued Jun. 15, 2015, 3 pages.
Office Action corresponding to Japanese Application No. 2010-152049 issued Jan. 30, 2015.

* cited by examiner

HEATING APPARATUS OF FUEL CELL VEHICLE

RELATED APPLICATIONS

This application is a 35 U.S.C. §371 national stage application of PCT Application No. PCT/JP2011/062883, filed on Jun. 6, 2011, which claims priority from Japanese Application No. 2010-152049 filed Jul. 2, 2010, the contents of which are incorporated herein by reference in their entireties. The above-referenced PCT International Application was published as International Publication No. WO 2012/002105 A1 on Jan. 5, 2012.

TECHNICAL FIELD

The present invention relates to a heating apparatus of a fuel cell vehicle, and more particularly to a heating apparatus of a fuel cell vehicle, which heats the interior of the vehicle compartment by using an air-cooled fuel cell system.

BACKGROUND ART

A fuel cell system mounted on a fuel cell vehicle generates electricity through electrochemical reaction and produces water in association with the electrochemical reaction. The fuel cell (stack) of the fuel cell system is usually configured by stacking many minimum structural units, referred to as cells. In a conventional solid polymer fuel cell, as shown in FIG. 7, each of the cells 201 is configured such that catalyst layers 206 and 207 for activation of the reaction, between which an electrolyte membrane 208 selectively allowing permeation of hydrogen ions is sandwiched, are provided between diffusion layers 204 and 205, and such that the diffusion layers 204 and 205 are sandwiched between an anode electrode 202 and a cathode electrode 203 for respectively supplying hydrogen and air (oxygen).

Hydrogen molecules supplied to the anode electrode 202 turn into active hydrogen atoms in the catalyst layer 206 provided on the surface of the electrolyte membrane 208 on the side of the anode electrode 202, and further turn into hydrogen ions to release electrons. The reaction indicated by (1) in FIG. 7 is expressed by following Chemical Formula 1.

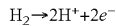

$$H_2 \rightarrow 2H^+ + 2e^- \quad \text{(Formula 1)}$$

Hydrogen ions generated in Chemical Formula 1 are moved through the electrolyte membrane 208 from the side of the anode electrode 202 to the side of the cathode electrode 203 together with moisture contained in the electrolyte membrane 208, while electrons are moved to the side of the cathode electrode 203 through an external circuit 209. By the movement of electrons, current flows through a load (for example, a traveling motor of a vehicle) 210 interposed in the external circuit 209.

On the other hand, oxygen molecules in the air supplied to the cathode electrode 203 receive, in the catalyst layer 207, electrons supplied from the external circuit 209, so as to turn into oxygen ions, and the oxygen ions combine with the hydrogen ions having moved through the electrolyte membrane 208, so as to form water. The reaction indicated by (2) in FIG. 7 is expressed by following Chemical Formula 2.

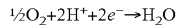

$$\tfrac{1}{2}O_2 + 2H^+ + 2e^- \rightarrow H_2O \quad \text{(Formula 2)}$$

A part of water formed in this way moves from the cathode electrode 203 to the anode electrode 202 by concentration diffusion.

In the above-described chemical reaction, various losses, such as a resistance overvoltage resulting from the electric resistance of the electrolyte membrane 208 and the electrode, an activation overvoltage required for causing the electrochemical reaction of hydrogen and oxygen, and a diffusion overvoltage required for causing the movement of hydrogen and oxygen through the diffusion layers 204 and 205, are generated in the inside of the cell 201, and the waste heat generated due to the losses needs to be removed.

FIG. 8 shows a general configuration of a water-cooled fuel cell system equipped with the cell 201 and used for a conventional fuel cell vehicle. In a fuel cell system 301 shown in FIG. 8, a fuel cell 302 configured by stacking many cells that are the minimum structural units described above is provided, and power generation is performed by the many cells stacked in the fuel cell 302 in such a manner that compressed hydrogen gas stored in a high pressure hydrogen tank 303 is introduced from an anode intake passage 304 into an anode intake portion 306 of the fuel cell 302 via a pressure reducing valve 305, and that, on the other hand, the outside air drawn into a cathode intake passage 308 through a filter 307 is compressed by a compressor 309, so as to be introduced into a cathode intake portion 310 of the fuel cell 302.

After a part of moisture in cathode exhaust gas discharged from a cathode exhaust portion 311 of the fuel cell 302 into a cathode exhaust passage 312 is separated by a gas-liquid separator 313, the cathode exhaust gas is discharged to the outside air via a backpressure valve 314 used for the pressure control of the cathode system. Similarly, anode exhaust gas discharged from an anode exhaust portion 315 of the fuel cell 302 into an anode exhaust passage 316 is made to pass through a gas-liquid separator 317, and is mixed into the cathode exhaust gas through the anode exhaust passage 316 connected in the middle of the cathode exhaust passage 312 via a purge valve 318.

The exhaust amount (flow rate) of purge hydrogen from the anode exhaust portion 315 is sufficiently small as compared with the amount of cathode exhaust gas. For this reason, the anode purge hydrogen can be discharged to the outside air after the concentration of the anode purge hydrogen is reduced by the cathode exhaust gas to at most the flammable lower limit concentration of 4%. Note that there are also some systems in which, in order to improve the utilization of hydrogen, the anode exhaust gas is recirculated to the anode intake portion 306 by using a hydrogen pump 320 interposed in an anode return path 319 connecting the anode exhaust passage 316 to the anode intake portion 306.

Here, a cooling system 321 of the water cooled fuel cell system 301 is described. In a cooling water introduction passage 322 of the cooling loop of the cooling system 321, a water pump 323 is provided at a stage preceding or subsequent to the fuel cell 302, so as to pressure-feed cooling water to a radiator 324. After cooling the fuel cell 302, the cooling water is subjected to heat exchange in the radiator 324, and is then again returned to the fuel cell 302 through a cooling water lead-out passage 325 of the cooling loop.

A heating apparatus 326 is provided in the cooling system 321. The heating apparatus 326 includes a heating passage 327 for connecting the cooling water introduction passage 322 to the cooling water lead-out passage 325, and also includes a heater core 329 for heating the interior of the vehicle compartment, and a regulating valve 328 which are connected in series with each other by the heating passage 327, and which are provided in parallel with the radiator 324. When the interior of the vehicle compartment needs to be heated, the heating apparatus 326 performs heating by opening the regulating valve 328 to supply high temperature cooling water to the heater core 329 and by driving a fan 330 for blowing air. However, the amount of waste heat of the fuel cell 302 is very small as compared with the amount of heat generated by an engine, and hence the other auxiliary heat source, such as an electric heater, is generally used in addition to the heater core 329.

As described above, the water-cooled fuel cell vehicle system 301 is provided with various auxiliary units including the compressor 309 for compressing the introduced air, in order to increase the output power density of the fuel cell 302. For this reason, in the water-cooled fuel cell vehicle system 301, the system is complicated, and the size, weight and cost of the system are increased. On the other hand, there is an air-cooled fuel cell system in which the system is simplified in such a manner that auxiliary units, such as a compressor, are eliminated as much as possible, and that an air cooling system is adopted for cooling the fuel cell.

As shown in FIG. 9, in an air-cooled fuel cell system 401 equipped with a fuel cell 402 configured by stacking many cells that are minimum structural units as described above, a compressed hydrogen gas stored in a high pressure hydrogen tank 403 is introduced into an anode intake portion 406 of the fuel cell 402 after the pressure of the compressed hydrogen gas is reduced by a pressure reducing valve 405 interposed in an anode intake passage 404. On the other hand, in the fuel cell system 401, the high-pressure compressor for supplying cathode intake air, which is provided in the water-cooled fuel cell vehicle system, is not generally provided, and the outside air drawn into a cathode intake passage 408 through a filter 407 is supplied to a cathode intake portion 410 of the fuel cell 402 by a low-pressure air supply fan (blower) 409.

The air supplied to the cathode intake portion 410 is not only used as the reaction gas reacting with hydrogen in power generation reaction in the many cells stacked in the fuel cell 402 but also plays a role of removing the waste heat in the fuel cell 402 so as to cool the fuel cell 402. The air after reaction with hydrogen and the air after cooling the fuel cell 402 are discharged from a cathode exhaust portion 411 of the fuel cell 402 to a cathode exhaust passage 412, so as to be discharged to the outside air. The anode exhaust gas discharged from an anode exhaust portion 413 of the fuel cell 402 to an anode exhaust passage 414 is mixed into the cathode exhaust gas through the anode exhaust passage 414 connected in the middle of the cathode exhaust passage 412 via a purge valve 415. When the hydrogen gas on the anode side is purged, the exhaust hydrogen gas is diluted to the flammable lower limit concentration or less by the cathode side exhaust gas, so as to be discharged to the outside.

The air-cooled fuel cell system 401 is not equipped with the cooling system 321 as provided in the water-cooled fuel cell system 301 shown in FIG. 8, and hence cannot realize a heating apparatus similar to the heating apparatus 326 in the water-cooled fuel cell system 301.

As examples of a heating apparatus of a conventional fuel cell vehicle, there have been proposed a heating apparatus in which cathode exhaust gas of a fuel cell is directly discharged into the vehicle compartment (Patent Literature 1), a heating apparatus in which cathode exhaust gas of a fuel cell is directly discharged into a vehicle compartment and is also led to a heat exchanger of the heating apparatus for heating the vehicle compartment (Patent Literature 2), and a heating apparatus in which cathode exhaust gas of a fuel cell is led to a heat exchanger of the heating apparatus for heating the vehicle compartment (Patent Literature 3).

CITATION LIST

Patent Literature

[Patent Literature 1]
Japanese Patent Application Laid-Open No. 2008-108538
[Patent Literature 2]
Japanese Patent Application Laid-Open No. 2002-5478
[Patent Literature 3]
Japanese Patent Application Laid-Open No. 2001-30742

SUMMARY OF INVENTION

Technical Problem

As described above, as a fuel cell system of a conventional fuel cell vehicle, the water-cooled fuel cell system 301 is generally used, in which, as shown in FIG. 8, waste heat generated by the fuel cell 302 formed by stacking a plurality of cells is cooled by cooling water similarly to when waste heat generated by a vehicle engine is cooled by cooling water. In the fuel cell vehicle using the water-cooled fuel cell system 301, cooling water, the temperature of which is relatively increased by cooling the fuel cell 302, is led to the heater core 329 (heat exchanger) of the heating apparatus 326 of the vehicle, so that the waste heat of the fuel cell 302 is used for the heating the interior of the vehicle compartment.

On the other hand, unlike the water-cooled fuel cell system 301, there is known, as shown in FIG. 9, the air-cooled fuel cell system 401 in which the system configuration can be significantly simplified by eliminating auxiliary units as much as possible. The fuel cell vehicle using the air-cooled fuel cell system 401 has a simple configuration and has many merits, such as small size, light weight, and low cost.

However, in the air-cooled fuel cell system 401, waste heat of the cooling water of the fuel cell 402 cannot be used for heating the interior of the vehicle compartment, and there has been so far no proposal about an effective heating method and apparatus.

An object of the present invention is to realize a heating apparatus of a fuel cell vehicle, in which exhaust hydrogen gas in anode exhaust gas of a fuel cell can be diluted to the flammable lower limit concentration or less, and in which waste heat of a fuel cell system can be used for heating in such a manner that an air-cooled fuel cell system having a simple system configuration is used as it is to heat the interior of the vehicle compartment.

Solution to Problem

According to the present invention, there is provided a heating apparatus of a fuel cell vehicle including a fuel cell for generating electricity by a chemical reaction of oxygen and hydrogen, a cathode exhaust gas passage through which the outside air introduced and supplied to the cathode electrode of the fuel cell so as to be used for the power generation reaction is discharged from the fuel cell, and an anode exhaust passage through which the hydrogen is discharged from the fuel cell, the heating apparatus being featured by including a branch passage which is branched from a branch point of the cathode exhaust passage so as to supply, to the vehicle compartment, the air discharged from the fuel cell, and featured in that the anode exhaust passage is joined to the cathode exhaust passage on the downstream side of the branch point.

Advantageous Effects of Invention

In the heating apparatus of the fuel cell vehicle according to the present invention, the exhaust hydrogen gas in the anode exhaust gas can be diluted to the flammable lower limit concentration, or less, and the waste heat of the fuel cell system can be used for heating the vehicle compartment.

Further, in the heating apparatus of the fuel cell vehicle according to the present invention, the air-cooled fuel cell system having a simple configuration can be used as it is, because in the air-cooled fuel cell system, the cathode exhaust gas is directly introduced into the vehicle compartment which is required to be heated.

Also, in the heating apparatus of the fuel cell vehicle according to the present invention, the cathode exhaust passage is branched to the passage for heating and the passage for diluting the purge hydrogen, and hence the exhaust hydrogen gas in the anode exhaust gas can be prevented from entering the inside of the vehicle compartment which is required to be heated.

DESCRIPTION OF EMBODIMENTS

In the following, an example according to an embodiment of the present invention will be described with reference to accompanying drawings.

Example 1

Figure 1:
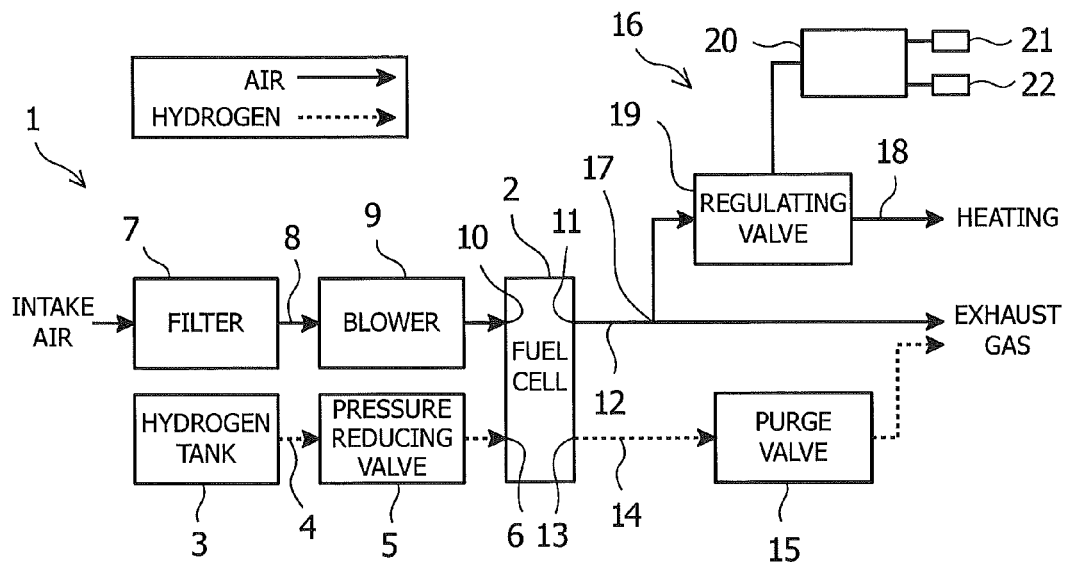
FIG. 1 is a block diagram of a heating apparatus of a fuel cell vehicle. (Example 1)
Figure 2:
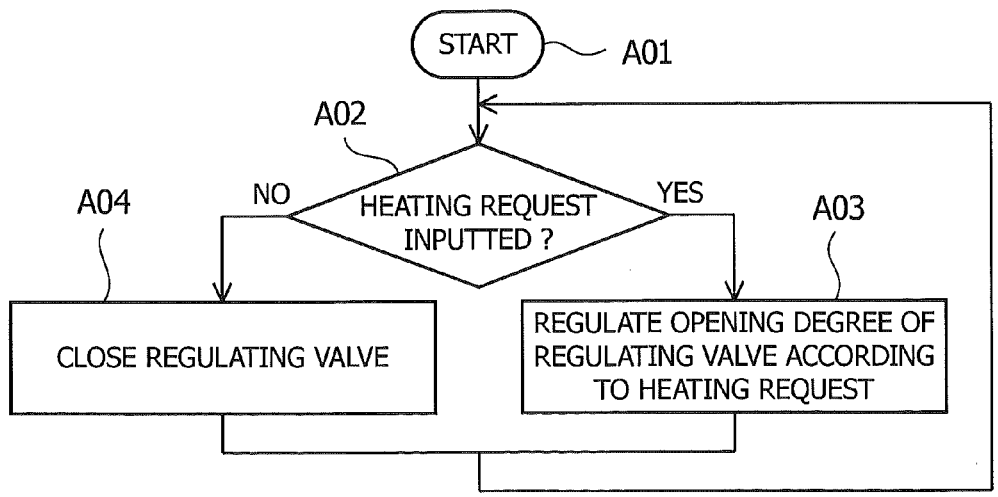
FIG. 2 is a flow chart of the heating apparatus of the fuel cell vehicle. (Example 1)

FIG. 1 and FIG. 2 show Example 1 according to the present invention. In FIG. 1, reference numeral 1 denotes an air-cooled fuel cell system mounted on a fuel cell vehicle. In the fuel cell system 1 which includes, as described above, a fuel cell 2 formed by stacking many minimum structural units referred to as cells, electricity is generated by the electrochemical reaction, and water is produced in association with the electrochemical reaction. In the fuel cell system 1, compressed hydrogen gas stored in a high pressure hydrogen tank 3 is introduced into an anode intake portion 6 of the fuel cell 2 after the pressure of the compressed hydrogen gas is reduced by a pressure reducing valve 5 interposed in an anode intake passage 4. On the other hand, in the fuel cell system 1, the high-pressure compressor for supplying cathode intake air, which is provided in the water-cooled fuel cell system, is not generally provided, and the outside air drawn into a cathode intake passage 8 through a filter 7 is supplied to a cathode intake portion 10 of the fuel cell 2 by a low-pressure air supply fan (blower) 9.

The air supplied to the cathode intake portion 10 is not only used as a reaction gas reacting with hydrogen in the power generation reaction in the many cells stacked in the fuel cell 2 but also plays a role of removing the waste heat in the fuel cell 2 so as to cool the fuel cell 2. The air after reaction with hydrogen and the air after cooling the fuel cell 2 are exhausted from a cathode exhaust portion 11 of the fuel cell 2 into a cathode exhaust passage 12, so as to be discharged to the outside air. Anode exhaust gas exhausted from an anode exhaust portion 13 of the fuel cell 2 is introduced into an anode exhaust passage 14. The anode exhaust passage 14, in the middle of which a purge valve 15 is interposed, is connected to the cathode exhaust passage 12. The anode exhaust gas of the anode exhaust passage 14 is mixed into the cathode exhaust gas of the cathode exhaust passage 12 through the purge valve 15. When the hydrogen gas of the anode side is purged, the exhaust hydrogen gas is diluted to the flammable lower limit concentration or less by the cathode side exhaust gas, so as to be discharged to the outside air.

The fuel cell vehicle includes a heating apparatus 16 using the waste heat of the fuel cell system 1. In the heating apparatus 16, a branch passage 18 branched at a branch point 17 of the cathode exhaust passage 12 is provided, and a regulating valve 19 is interposed in the branch passage 18. The branch passage 18 allows the cathode exhaust passage 12 to communicate with the interior of the vehicle compartment via the regulating valve 19. In the heating apparatus 16, the cathode exhaust gas of the cathode exhaust passage 12 is led to the vehicle compartment through the branch passage 18, so as to be used for heating the interior of the compartment. The anode exhaust passage 14 is connected to the cathode exhaust passage 12 on the downstream side of the branch point 17, and is used for diluting the exhaust hydrogen gas in the anode exhaust gas.

The regulating valve 19 is connected to a control portion 20 of the heating apparatus 16. Heating request input means 21, in which the presence or absence of the heating request, and a required amount of heat are input by an operator's operation, is connected to the control portion 20. On the basis of the input in the heating request input means 21, the control portion 20 performs stepless opening and closing control of the regulating valve 19 interposed in the branch passage 18.

As shown in FIG. 2, in the heating apparatus 16 of the fuel cell vehicle, when the control portion 20 starts the control (A01), the control portion 20 determines whether or not a heating request is input in the heating request input means 21 (A02). When the determination (A02) is YES, the control portion 20 steplessly adjusts the degree of opening of the regulating valve 19 according to the heating request (A03), and returns to START (A01). When the determination (A02) is NO, the control portion 20 closes the regulating valve 19 (A04), and returns to START (A01). Note that, when the heating request is cancelled in the heating request input means 21, the control portion 20 closes the regulating valve 19, so as to end the control.

In this way, in the heating apparatus 16 of the fuel cell vehicle, the branch passage 18, which is branched from the branch point 17 of the cathode exhaust passage 12 and which supplies, to the vehicle compartment, the air discharged from the fuel cell 2, is provided, and the anode exhaust passage 14 is connected to the cathode exhaust passage 12 on the downstream side of the branch point 17.

Thereby, in the heating apparatus 16, the exhaust hydrogen gas in the anode exhaust gas is diluted to at most the flammable lower limit concentration, and the waste heat of the fuel cell system 1 can be used for heating the vehicle compartment. Further, in the heating apparatus 16, the air-cooled fuel cell system 1 having a simple configuration can be used as it is, because in the air-cooled fuel cell system 1, the cathode exhaust gas is directly introduced into the vehicle compartment which is required to be heated. Further, in the heating apparatus 16, the cathode exhaust gas passage is branched to the passage for heating and the passage for diluting the purge hydrogen, and hence the exhaust hydrogen gas in the anode exhaust gas can be prevented from being introduced into the vehicle compartment which is required to be heated.

Further, in the heating apparatus 16, the regulating valve 19 is interposed in the branch passage 18, and the degree of opening of the regulating valve 19 can be changed so as to change the flow rate of the cathode exhaust gas according to the required amount of heating. Thereby, it is possible to obtain the flow rate of the cathode exhaust gas according to the required amount of heating.

Note that, in the heating apparatus 16, a hydrogen sensor 22 for detecting the concentration of hydrogen is provided in the vehicle compartment, so as to be connected to the control portion 20. Thereby, the leakage of the hydrogen gas into the vehicle compartment, which is required to be heated, can be prevented in such a manner that, when the hydrogen sensor 22 detects a leakage of hydrogen, the control portion 20 performs control to fully close the regulating valve 19.

Example 2

Figure 3:
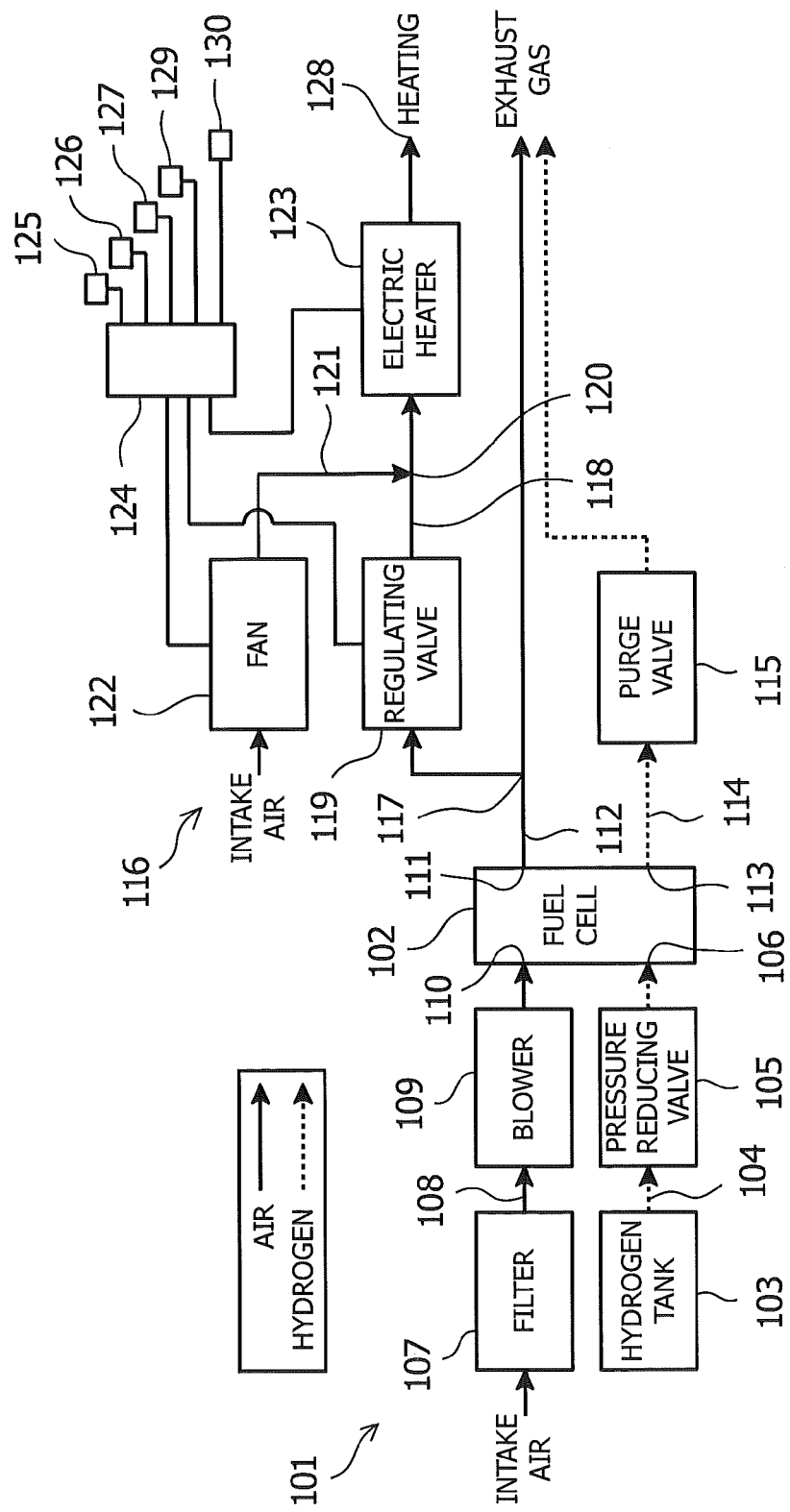
FIG. 3 is a block diagram of a heating apparatus of a fuel cell vehicle. (Example 2)
Figure 4:
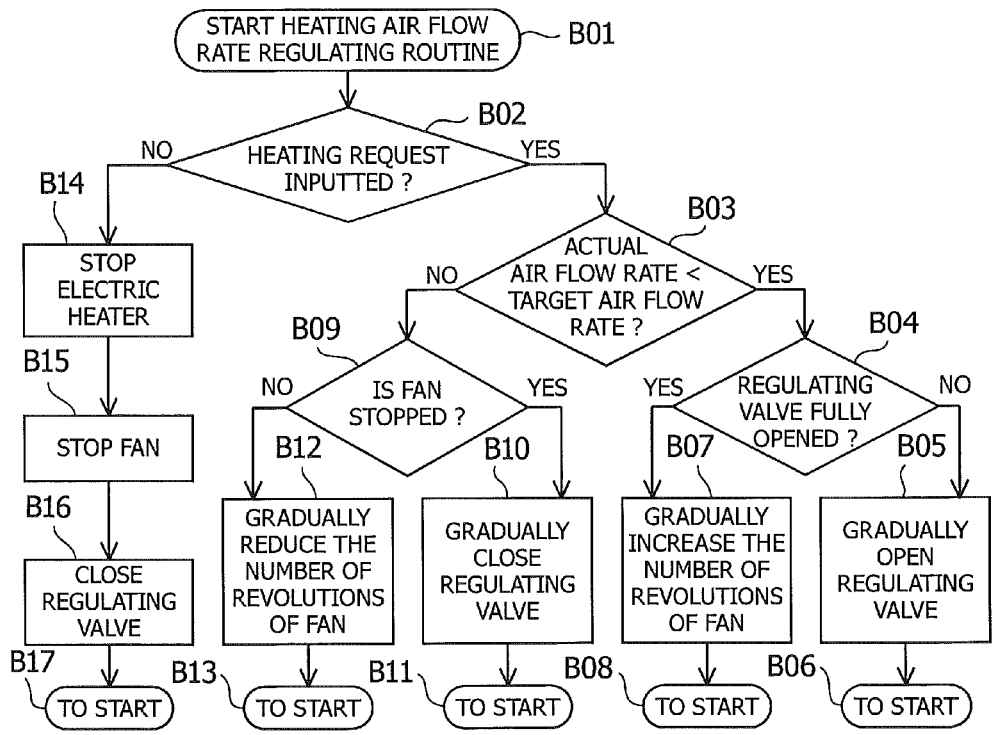
FIG. 4 is a flow chart for adjusting the flow rate of heating air of the heating apparatus of the fuel cell vehicle. (Example 2)
Figure 5:
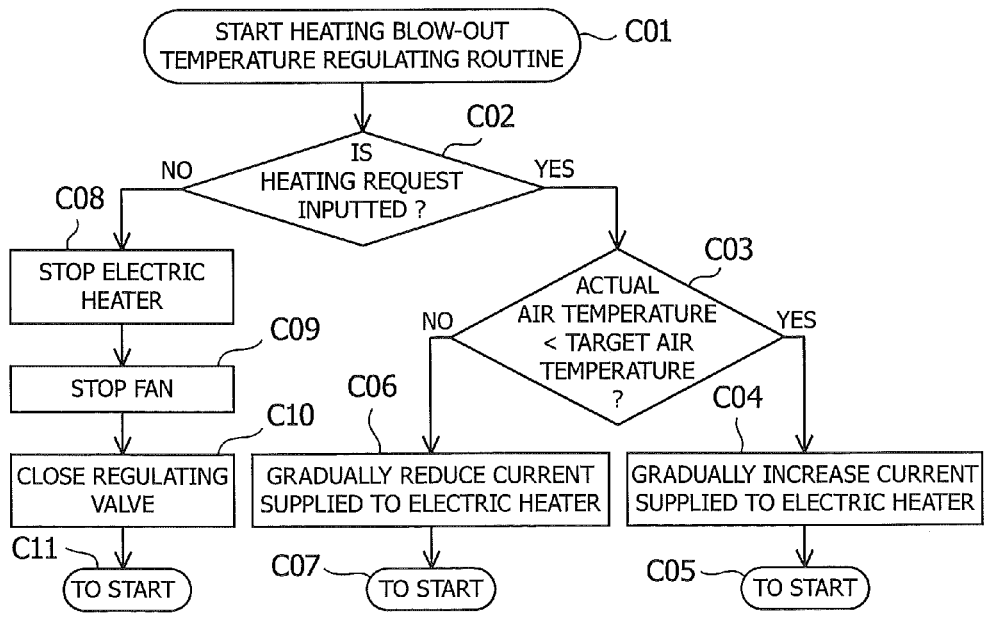
FIG. 5 is a flow chart for adjusting the blow-out air temperature of the heating apparatus of the fuel cell vehicle. (Example 2)

FIG. 3 to FIG. 5 show Example 2 according to the present invention.

The amount of heat of the exhaust gas after cooling the fuel cell 2 of the fuel cell system 1 of Example 1 described above is small compared with the amount of heat of the cooling water after cooling the fuel cell of the water-cooled fuel cell system, and hence is, in many cases, insufficient as the heat source for heating the interior of the vehicle compartment. For this reason, in Example 1 described above, the amount of heat of the exhaust gas may become insufficient for heating the interior of the vehicle compartment. In Example 2, the heating performance is improved in the case in which the heating is insufficient in Example 1.

In FIG. 3, reference numeral 101 denotes an air-cooled fuel cell system mounted on a fuel cell vehicle. The fuel cell system 101 of Example 2 includes a fuel cell 102 formed by stacking many minimum structural units referred to as cells. In the fuel cell system 101, compressed hydrogen gas stored in a high pressure hydrogen tank 103 is introduced into an anode intake portion 106 of the fuel cell 102 after the pressure of the compressed hydrogen gas is reduced by a pressure reducing valve 105 interposed in an anode intake passage 104. On the other hand, in the fuel cell system 101, the high-pressure compressor for supplying cathode intake air, which is provided in the water-cooled fuel cell system, is not generally provided, and the outside air drawn into a cathode intake passage 108 through a filter 107 is supplied to a cathode intake portion 110 of the fuel cell 102 by a low-pressure air supply fan (blower) 109.

The air supplied to the cathode intake portion 110 is not only used as a reaction gas reacting with hydrogen in the power generation reaction in the many cells stacked in the fuel cell 102 but also plays a role of removing the waste heat in the fuel cell 102 to cool the fuel cell 102. The air after reaction with hydrogen and the air after cooling the fuel cell 102 are exhausted from a cathode exhaust portion 111 of the fuel cell 102 into a cathode exhaust passage 112, so as to be discharged to the outside air. Anode exhaust gas exhausted from an anode exhaust portion 113 of the fuel cell 102 is introduced into an anode exhaust passage 114. The anode exhaust passage 114, in which a purge valve 115 is interposed, is connected to the cathode exhaust passage 112. The anode exhaust gas of the anode exhaust passage 114 is mixed into the cathode exhaust gas of the cathode exhaust passage 112 through the purge valve 115. When the hydrogen gas of the anode side is purged, the exhaust hydrogen gas is diluted to the flammable lower limit concentration or less by the cathode side exhaust gas, so as to be discharged to the outside air.

The fuel cell vehicle includes a heating apparatus 116 using the waste heat of the fuel cell system 101. In the heating apparatus 116 of Example 2, a branch passage 118 branched at a branch point 117 of the cathode exhaust passage 112 is provided, and a regulating valve 119 is interposed in the branch passage 118. The branch passage 118 enables the cathode exhaust passage 112 to communicate with the interior of the vehicle compartment via the regulating valve 119. In the heating apparatus 116, the cathode exhaust gas of the cathode exhaust passage 112 is led to the vehicle compartment through the branch passage 118, so as to be used for heating the interior of the compartment. The anode exhaust passage 114 is connected to the cathode exhaust passage 112 on the downstream side of the branch point 117, and is used for diluting the exhaust hydrogen gas in the anode exhaust gas.

Further, in the heating apparatus 116, an outside air passage 121 opened to the outside air is connected to a joining portion 120 of the branch passage 118 on the downstream side of the regulating valve 119. A push-in fan 122 for introducing the outside air is provided at the outside air passage 121. The outside air passage 121 allows the outside air introduced by the fan 122 to be introduced into the branch passage 118 through the joining portion 120 so that the introduced outside air is mixed with the cathode exhaust gas having passed through the regulating valve 119 so as to be introduced into the vehicle compartment. Further, in the heating apparatus 116, an electric heater 123, such as a PTC heater, which is used as an auxiliary heat source, is provided at the branch passage 118 on the downstream side of the joining portion 120.

The regulating valve 119, the fan 122, and the electric heater 123 are connected to a control portion 124 of the heating apparatus 116. The control portion 124 is connected with air flow rate detection means 125 for detecting the flow rate of the air blown out to the interior of the vehicle compartment from the branch passage 118, air temperature detection means 126 for detecting the temperature of the air blown out to the interior of the vehicle compartment from the branch passage 118, and heating request input means 127 for inputting the presence or absence of a heating request, and a required amount of heat according to an operator's operation. The air flow rate detection means 125 and the air temperature detection means 126 are provided at a heating blow-out portion 128 of the branch passage 118 in the vehicle compartment.

The control portion 124 compares the actual air flow rate detected by the air flow rate detection means 125 with the target air flow rate based on the required amount of heating set by the heating request input means 127. On the basis of the comparison result, the control portion 124 changes the opening degree of the regulating valve 119 and the number of revolutions of the fan 122. Further, the control portion 124 compares the actual air temperature detected by the air temperature detection means 126 with the target air temperature based on the required amount of heating set by the heating request input means 127. On the basis of the comparison result, the control portion 124 changes the current supplied to the electric heater 123.

The heating apparatus 116 of the fuel cell vehicle adjusts the flow rate of the air for heating as shown in FIG. 4, and adjusts the blow-out air temperature of the heating as shown in FIG. 5. These kinds of control are processed in parallel by the control portion 124 as follows.

In the adjustment of the flow rate of the air for heating, as shown in FIG. 4, when the control portion 124 starts the control to adjust the flow rate of the air for heating (B01), the control portion 124 determines whether or not the heating request is inputted by the heating request input means 127 (B02). When the determination (B02) is YES, the control portion 124 determines whether or not the actual air flow rate is less than the target air flow rate (B03).

When the determination (B03) is YES, the control portion 124 determines whether or not the regulating valve 119 is fully opened (B04). When the determination (B04) is NO, the control portion 124 gradually opens the regulating valve 119 (B05), and returns to START (B01) (B06). When the determination (B04) is YES, the control portion 124 gradually increases the number of revolutions of the fan 122 (B07), and returns to START (B01) (B08).

On the other hand, when the determination (B03) is NO, the control portion 124 determines whether or not the fan 122 is stopped (B09). When the determination (B09) is YES, the control portion 124 gradually closes the regulating valve 119 (B10), and returns to START (B01) (B11). When the determination (B09) is NO, the control portion 124 gradually reduces the number of revolutions of the fan 122 (B12), and returns to START (B01) (B13).

On the other hand, when the determination (B02) is NO, the control portion 124 stops the electric heater 123 (B14), stops the fan 122 (B15), closes the regulating valve 119 (B16), and returns to START (B01) (B17).

In this way, when detecting a heating request, the control portion 124 of the heating apparatus 116 compares the actual air flow rate measured by the air flow rate detection means 125 provided at the heating blow-out portion 128 of the branch passage 118 in the vehicle compartment, with the target air flow rate based on the request of the operator and input by the heating request input means 127. In the case in which the measured air flow rate is less than the target air flow rate, when the regulating valve 119 is not fully opened, the control portion 124 increases the flow rate of the supplied air by gradually opening the regulating valve 119. Even in the case in which the regulating valve 119 is fully opened, when the flow rate of the air is still insufficient, the control portion 124 increases the flow rate of the air by gradually increasing the number of revolutions of the fan 122.

In contrast, in the case in which the actual flow rate of the air is greater than the target flow rate of the air, the control portion 124 performs, when the fan 122 is rotated, control so as to gradually reduce the number of revolutions of the fan 122, and performs, when the fan 122 is stopped, control so as to make the actual flow rate of the air coincide with the target flow rate of the air by gradually closing the regulating valve 119. When the heating request is not input by the heating request input means 127, the control portion 124 performs control to stop the electric heater 123 and the fan 122, and to close the regulating valve 119.

Thereby, in correspondence with the target flow rate of the air supplied into the vehicle compartment which is required to be heated, the heating apparatus 116 of the fuel cell vehicle can change the flow rate of the air supplied into the vehicle compartment. Note that the air flow rate detection means 125 is provided at the heating blow-out portion 128, but when the flow rate of the air supplied into the vehicle compartment can be estimated from the number of revolutions of the fan 122, or from the operating state of the fuel cell system 101, the air flow rate detection means 125 can be omitted.

Further, in the adjustment of the blow-out air temperature of the heating, as shown in FIG. 5, when the control portion 124 starts the control to adjust the blow-out air temperature of the heating (C00, the control portion 124 determines whether or not a heating request is input by the heating request input means 127 (C02). When the determination (C02) is YES, the control portion 124 determines whether or not the actual air temperature is less than the target air temperature (C03).

When the determination (C03) is YES, the control portion 124 gradually increases the current supplied to the electric heater 123 (C04), and returns to START (C01) (C05). When the determination (C03) is NO, the control portion 124 gradually reduces the current supplied to the electric heater 123 (C06), and returns to START (C01) (C07).

On the other hand, when the determination (C02) is NO, the control portion 124 stops the electric heater 123 (C08), stops the fan 122 (C09), closes the regulating valve 119 (C10), and returns to START (C01) (C11).

In this way, when detecting a heating request, the control portion 124 of the heating apparatus 116 compares the actual air temperature measured by the air temperature detection means 126 provided at the heating blow-out portion 128, with the target air temperature based on the request of the operator and inputted by the heating request input means 127. When the actual air temperature is less than the target air temperature, the control portion 124 increases the temperature of the blown-out air by gradually increasing the current supplied to the electric heater 123. In contrast, when the actual air temperature is higher than the target air temperature, the control portion 124 reduces the temperature of the blown-out air by gradually reducing the current supplied to the electric heater 123. When the heating request is not input by the heating request input means 127, the control portion 124 performs control to stop the electric heater 123 and the fan 122, and to close the regulating valve 119.

Thereby, the heating apparatus 116 of the fuel cell vehicle can change the temperature of the blown-out air in correspondence with the target temperature of the air supplied into the vehicle compartment which is required to be heated.

Here, the cathode exhaust gas of the fuel cell system 101 is described. As described above, the cathode exhaust gas of the fuel cell system 101 contains the moisture generated in association with the electrochemical reaction of hydrogen and oxygen, and hence has humidity relatively higher than the humidity of the intake air. Therefore, there is a possibility that, when the heating is performed in winter or during rainy weather, fogging of the window, such as the front window, occurs in the vehicle compartment.

In order to solve this problem, in the heating apparatus 116 of the fuel cell vehicle of Example 2, the control portion 124 performs the following control. That is, in the heating apparatus 116, window fogging detection means 129 for detecting the fogging of the front window of the vehicle compartment is provided and is connected to the control portion 124. When the fogging of the front window is detected by the window fogging detection means 129, the control portion 124 reduces the amount of the cathode exhaust gas by making the opening degree of the regulating valve 119 smaller than the opening degree set beforehand, and thereby increases the amount of outside air introduced by the fan 122.

In this way, in the heating apparatus 116, when the fogging of the front window is detected by the window fogging detection means 129, and when a fogging detection signal is transmitted to the control portion 124, the control portion 124 restricts the maximum opening degree of the regulating valve 119 to a certain specific threshold value. When the maximum opening degree of the regulating valve 119 is set to a threshold value, which is defined on the basis of the pipe diameter of the heating apparatus 116, a relationship between the flow rate of the exhaust gas in the fuel cell 102 and the flow rate of the intake air supplied by the fan 122, and the like, the maximum value of the flow rate of the cathode exhaust gas in the fuel cell 102 is reduced. Thereby, the flow rate of the intake air which is the outside air having a low temperature and supplied by the fan 122 is relatively increased, so that the fogging of the front window can be eliminated. Note that it can also be configured such that, when the fogging of the front window is visually confirmed by an occupant, the fogging detection signal, which is to be inputted into the control portion 124, is transmitted to the control portion 124 according to an operation of a switch, and the like, performed by the occupant.

Further, in the heating apparatus 116 of Example 2, the leakage of the hydrogen gas into the vehicle compartment which is required to be heated can be prevented in such a manner that a hydrogen sensor 130 for detecting the hydrogen concentration is provided in the vehicle compartment, so as to be connected to the control portion 124, and that, when a leakage of hydrogen is detected by the hydrogen sensor 130, the control portion 124 performs control to fully close the regulating valve 119.

Figure 6:
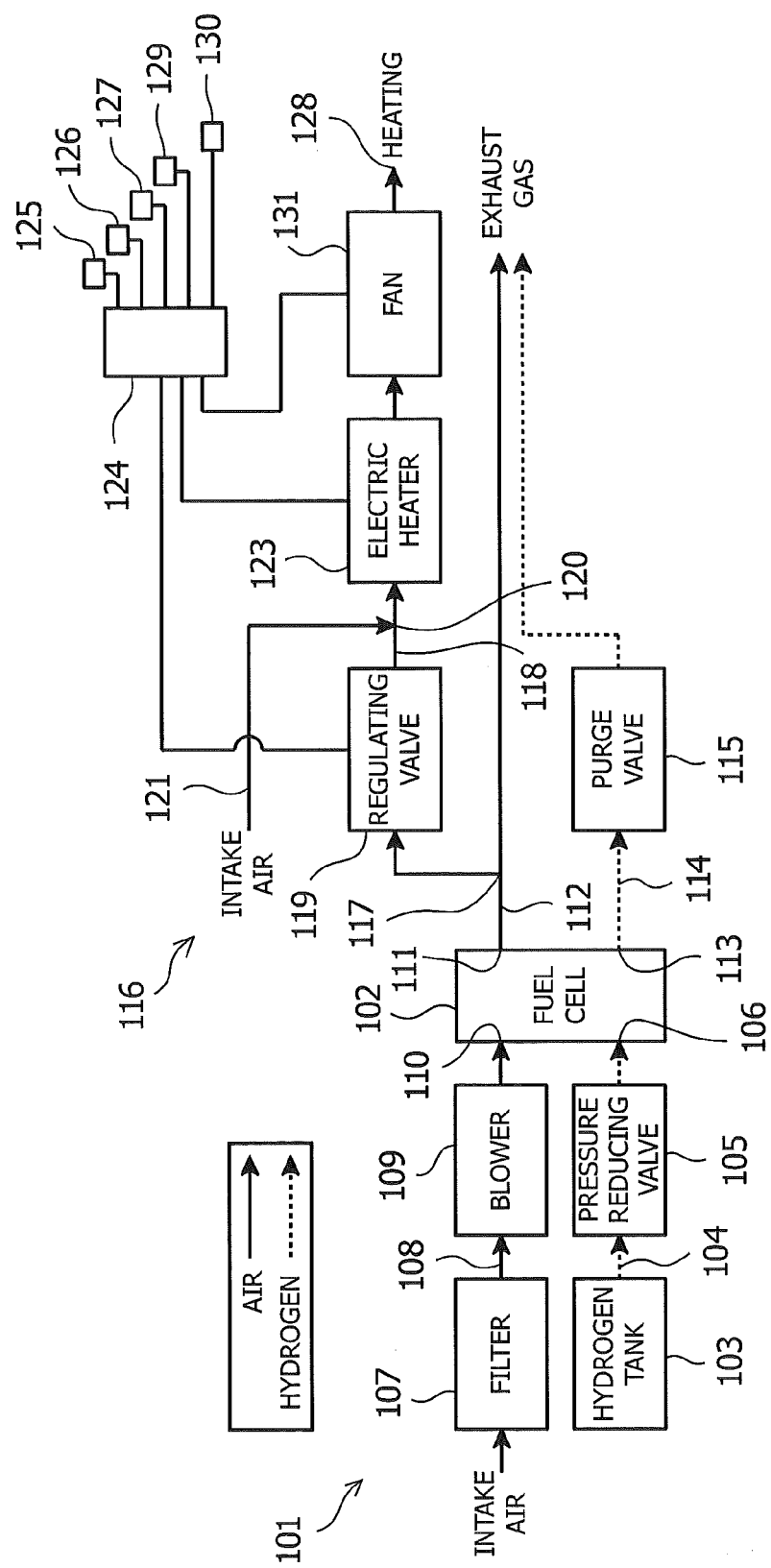
FIG. 6 is a block diagram of a heating apparatus of a fuel cell vehicle. (Modification)
Figure 7:
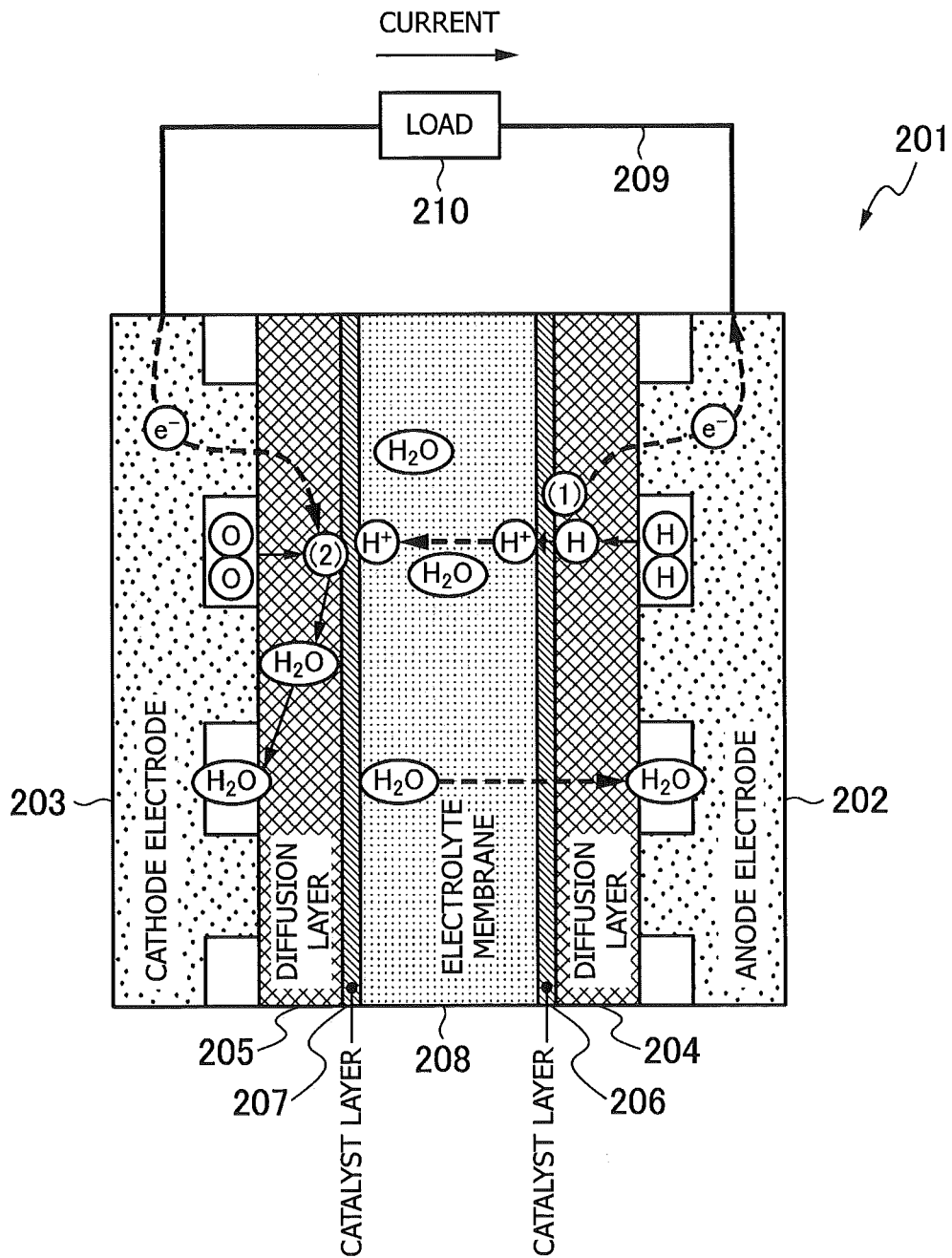
FIG. 7 is a cross-sectional view of a cell of a fuel cell.
Figure 8:
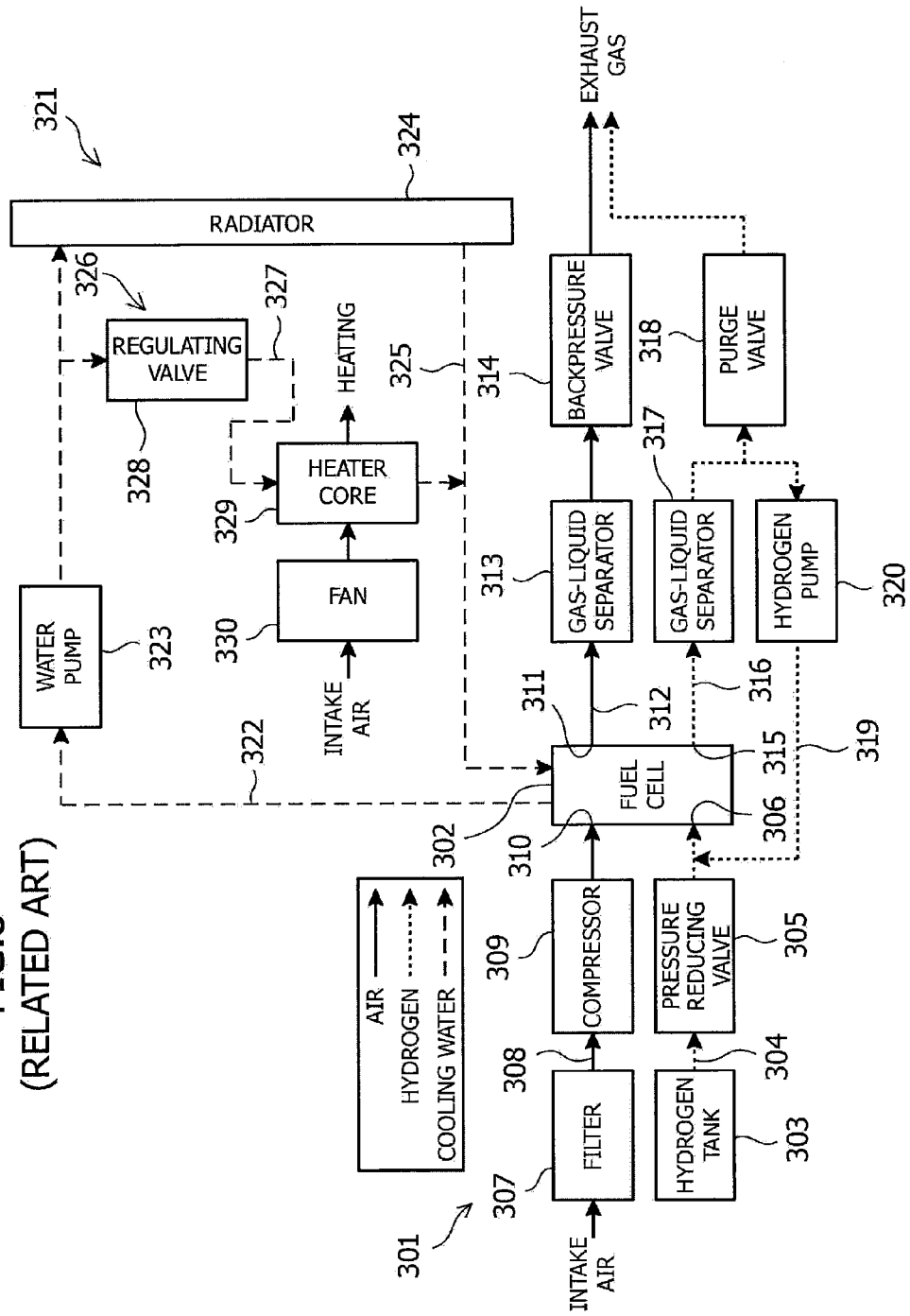
FIG. 8 is a block diagram of a water-cooled fuel cell system. (Related art form)
Figure 9:
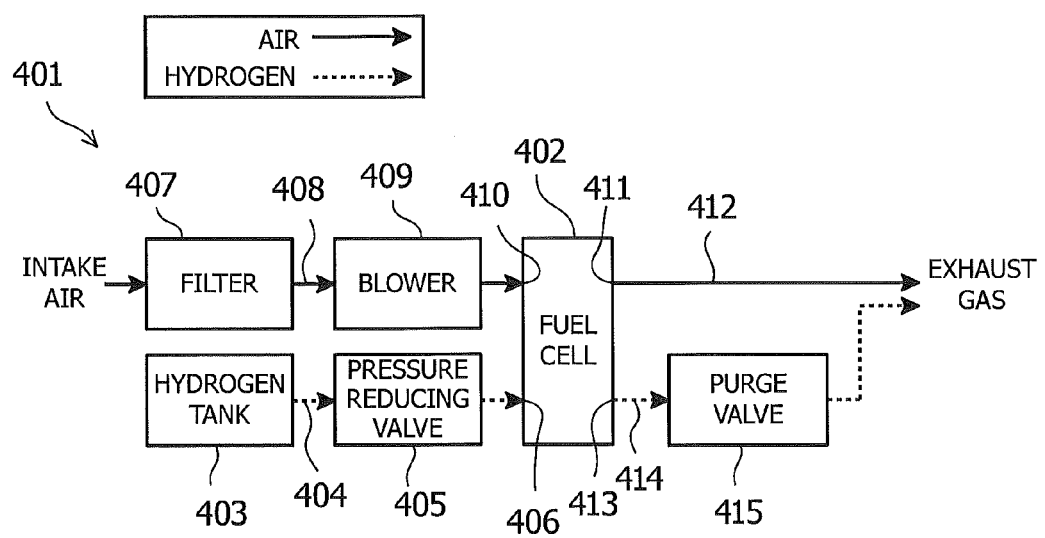
FIG. 9 is a block diagram of an air-cooled fuel cell system. (Related art form)

Note that, in the heating apparatus 116 of the fuel cell vehicle of Example 2, the push-in fan 122 for introducing the outside air is provided at the outside air passage 121 at a preceding stage of the electric heater 123, but as shown in FIG. 6, an intake fan 131 may also be provided at the branch passage 118 at a subsequent stage of the electric heater 123.

Also, in the heating apparatus 116 of the fuel cell vehicle of Example 2, similarly to Example 1 described above, the branch passage 118 which is branched from the branch point 117 of the cathode exhaust passage 112, and which supplies the air discharged from the fuel cell 102 to the vehicle compartment is provided, and the anode exhaust passage 114 is joined to the cathode exhaust passage 112 on the downstream side of the branch point 117. Thereby, the exhaust hydrogen gas in the anode exhaust gas can be diluted to the flammable lower limit concentration or less, and the waste heat of the fuel cell system 1 can be used for heating the vehicle compartment.

Further, in the heating apparatus 116 of Example 2, similarly to Example 1 described above, the air-cooled fuel cell system 101 having a simple configuration can be used as it is, because in the air-cooled fuel cell system 101, the cathode exhaust gas is directly introduced into the vehicle compartment which is required to be heated. Also, in the heating apparatus 116 of Example 2, the cathode exhaust passage is branched to the passage for heating and the passage for diluting the purge hydrogen, and hence the exhaust hydrogen gas in the anode exhaust gas can be prevented from entering the inside of the vehicle compartment which is required to be heated. Further, in the heating apparatus 116 of Example 2, the regulating valve 119 is interposed in the branch passage 118, and the opening degree of the regulating valve 119 can be changed so as to change the flow rate of the cathode exhaust gas according to the required amount of heating. Therefore, it is possible to obtain the flow rate of the cathode exhaust gas according to the required amount of heating.

INDUSTRIAL APPLICABILITY

The present invention relates to a heating apparatus of a fuel cell system mounted on a fuel cell vehicle, but can also be applied to indoor heating using a fixed-type air-cooled fuel cell system, such as an air-cooled fuel cell system for housing.

REFERENCE SIGNS LIST

1 Fuel cell system
2 Fuel cell
3 High pressure hydrogen tank
4 Anode intake passage
5 Pressure reducing valve
6 Anode intake portion
7 Filter
8 Cathode intake passage
9 Air supply fan
10 Cathode intake portion
11 Cathode exhaust portion
12 Cathode exhaust passage
13 Anode exhaust portion
14 Anode exhaust passage
15 Purge valve
16 Heating apparatus
17 Branch point
18 Branch passage
19 Regulating valve
20 Control portion
21 Heating request input means

The invention claimed is:
1. A heating apparatus of a fuel cell vehicle including a fuel cell for generating electricity by a chemical reaction of oxygen and hydrogen, a cathode exhaust passage through which outside air introduced and supplied to the cathode electrode of the fuel cell so as to be used for the power generation reaction is discharged from the fuel cell, and an anode exhaust passage through which the hydrogen is discharged from the fuel cell,
the heating apparatus comprising:
a branch passage which is branched from a branch point of the cathode exhaust passage and that is in communication with an interior of a vehicle compartment and supplies the air discharged from the fuel cell to the vehicle compartment, wherein the branch passage uses waste heat from the air discharged from the fuel cell for heating the vehicle compartment,
wherein the cathode exhaust passage on a downstream side of the branch point in which the branch passage is disposed is joined to the anode exhaust passage to be disposed as an exhaust passage in which the hydrogen discharged from the fuel cell is diluted to a flammable lower limit concentration or less so as to be discharged.

2. The heating apparatus of the fuel cell vehicle according to claim 1, further comprising:
a regulating valve interposed in the branch passage,
wherein an opening degree of the regulating valve is changed so as to change a flow rate of cathode exhaust gas according to a required amount of heating.

3. The heating apparatus of the fuel cell vehicle according to claim 2, further comprising:
a hydrogen sensor for measuring hydrogen concentration which is provided in the vehicle compartment,
wherein, when a leakage of hydrogen is detected by the hydrogen sensor, the regulating valve is fully closed.

4. The heating apparatus of the fuel cell vehicle according to claim 3, further comprising:
a fan for introducing outside air;
a passage for mixing the outside air introduced by the fan with the cathode exhaust gas having passed the regulating valve, and introducing the mixed gas into the vehicle compartment; and
air flow rate detection means for detecting a flow rate of air introduced into the vehicle compartment,
wherein an actual flow rate of the air detected by the air flow rate detection means is compared with a target flow rate of the air based on a required amount of heating, and the opening degree of the regulating valve and the number of revolutions of the fan are changed on the basis of the comparison result.

5. The heating apparatus of the fuel cell vehicle according to claim 2, further comprising:
a fan for introducing outside air;
a passage for mixing the outside air introduced by the fan with the cathode exhaust gas having passed the regulating valve, and introducing the mixed gas into the vehicle compartment; and
air flow rate detection means for detecting a flow rate of air introduced into the vehicle compartment,
wherein an actual flow rate of the air detected by the air flow rate detection means is compared with a target flow rate of the air based on a required amount of heating, and the opening degree of the regulating valve and the number of revolutions of the fan are changed on the basis of the comparison result.

6. The heating apparatus of the fuel cell vehicle according to claim 5, further comprising:
a window fogging detection means for detecting fogging of a front window,
wherein, when the fogging of the front window is detected by the window fogging detection means, the opening degree of the regulating valve is set to be smaller than an opening degree set beforehand, so as to increase the amount of outside air introduced by the fan.

* * * * *